(12) United States Patent
Davila

(10) Patent No.: US 7,062,966 B1
(45) Date of Patent: Jun. 20, 2006

(54) FUEL LEVEL SENSOR

(75) Inventor: Gabriel Davila, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/050,044

(22) Filed: Feb. 3, 2005

(51) Int. Cl.
*G01F 23/30* (2006.01)

(52) U.S. Cl. .......................................... 73/313; 73/314

(58) Field of Classification Search ................. 73/313, 73/314, 305, 308, 309, 322.5, 641
See application file for complete search history.

(56) References Cited

U.S. PATENT DOCUMENTS 2,416,059 A * 2/1947 William ....................... 338/33
4,637,254 A * 1/1987 Dyben et al. ................. 73/314
4,951,506 A * 8/1990 Lew ............................. 73/314

* cited by examiner

Primary Examiner—Hezron Williams
Assistant Examiner—Samir Shah
(74) Attorney, Agent, or Firm—Jimmy L. Funke

(57) ABSTRACT

A small profile fuel level sensor has a small float located in a vertically-oriented housing in a fuel tank, and instead of sliding against two resistive strips that output a level signal as fuel level changes, the float is drawn to and rolls against the two strips owing to the presence of a magnetic strip on the side of the resistive strips that is opposite the float. Accordingly, with the magnetic strip attracting the float against the resistive strips to force rollable contact therebetween instead of slidable contact, much less friction must be overcome to move the float and, hence, use of a relatively small float and overall small sensor assembly is facilitated.

16 Claims, 2 Drawing Sheets

FUEL LEVEL SENSOR

FIELD OF THE INVENTION

The present invention relates to tank level sensors.

BACKGROUND OF THE INVENTION

Most vehicle fuel tanks include a fuel level sensor for outputting a signal representative of the level of fuel in the tank. The signal can be used to drive a fuel gage, illuminate a warning light, etc.

One common fuel level mechanism is composed of a float on a wire arm that is supported in a wiper and bushing on a frame. The frame holds a ceramic card that includes a resistive strip for creating an electrical resistance when the strip touches a contact installed in the wiper. As critically recognized herein, while effective, the arrangement summarized above requires a considerably large space to accommodate a relatively large range of motion of the wire arm with float. One reason the large range of motion is required is to overcome the frictional force between the contact and the resistive strip by creating a relatively long moment arm on the end of which is the float, which long moment arm is sufficient to overcome the frictional force.

Another type of fuel level sensor uses the same basic concepts as the arrangement discussed above, with the difference being that a float is constrained to vertical movement against a vertically oriented conductive strip and resistor element. Although this configuration needs relatively less space than a float with wiper arm assembly, it uses a bigger float, again to overcome the frictional force between the contact assembly and the resistive strip.

Accordingly, as critically recognized herein, because of the size and complexity of these designs, they are used only in fuel tanks of cars and those few motorcycles that are equipped with relatively large fuel tanks. Vehicles such as smaller motorcycles or other vehicles with small fuel tanks cannot easily be equipped with the above-discussed fuel level sensors.

SUMMARY OF THE INVENTION

A fuel level sensor that can be disposed in fuel tank of a vehicle includes a float and a guide that constrains the float to substantially only reciprocal vertical movement. At least one resistive strip against which the float can roll in the vertical dimension is also provided, such that a signal can be obtained from the strip which represents the position of the float relative to the strip. According to one aspect of the present invention, an attraction strip can be disposed opposite the resistive strip from the float and can extend substantially the length of the resistive strip to attract the float. One or both of the float and the attractive strip is magnetic. With this structure, the float rolls against the resistive strip and substantially does not slide against the resistive strip, owing to the influence of the attractive strip.

In some embodiments two resistive strips are juxtaposed with each other, and each resistive strip is in rollable contact with the float. First and second electrical leads connect respective resistive strips to a level determination circuit.

In another aspect, a level sensor for a tank includes a housing holding a float, with motion of the float in the housing being constrained substantially to the vertical dimension when the sensor is disposed in the tank. At least one signal strip is disposed in the housing. Means are provided for magnetically forcing the float toward the signal strip such that when fluid level in the tank changes, the float rolls against the signal strip to alter a signal output therefrom, so that the float substantially does not slide against the signal strip.

In yet another aspect, a method for generating a signal representative of fluid level in a tank includes orienting a housing generally vertically in the tank, and disposing a float in the housing. The float is constrained for vertical-only motion in the housing. The method also includes juxtaposing one or more resistive strips with the float, and magnetically attracting the float against the strip so that the float can roll against but substantially cannot slide against the strip.

The details of the present invention, both as to its structure and operation, can best be understood in reference to the accompanying drawings, in which like reference numerals refer to like parts, and in which:

DESCRIPTION OF THE PREFERRED EMBODIMENT

Figure 1:
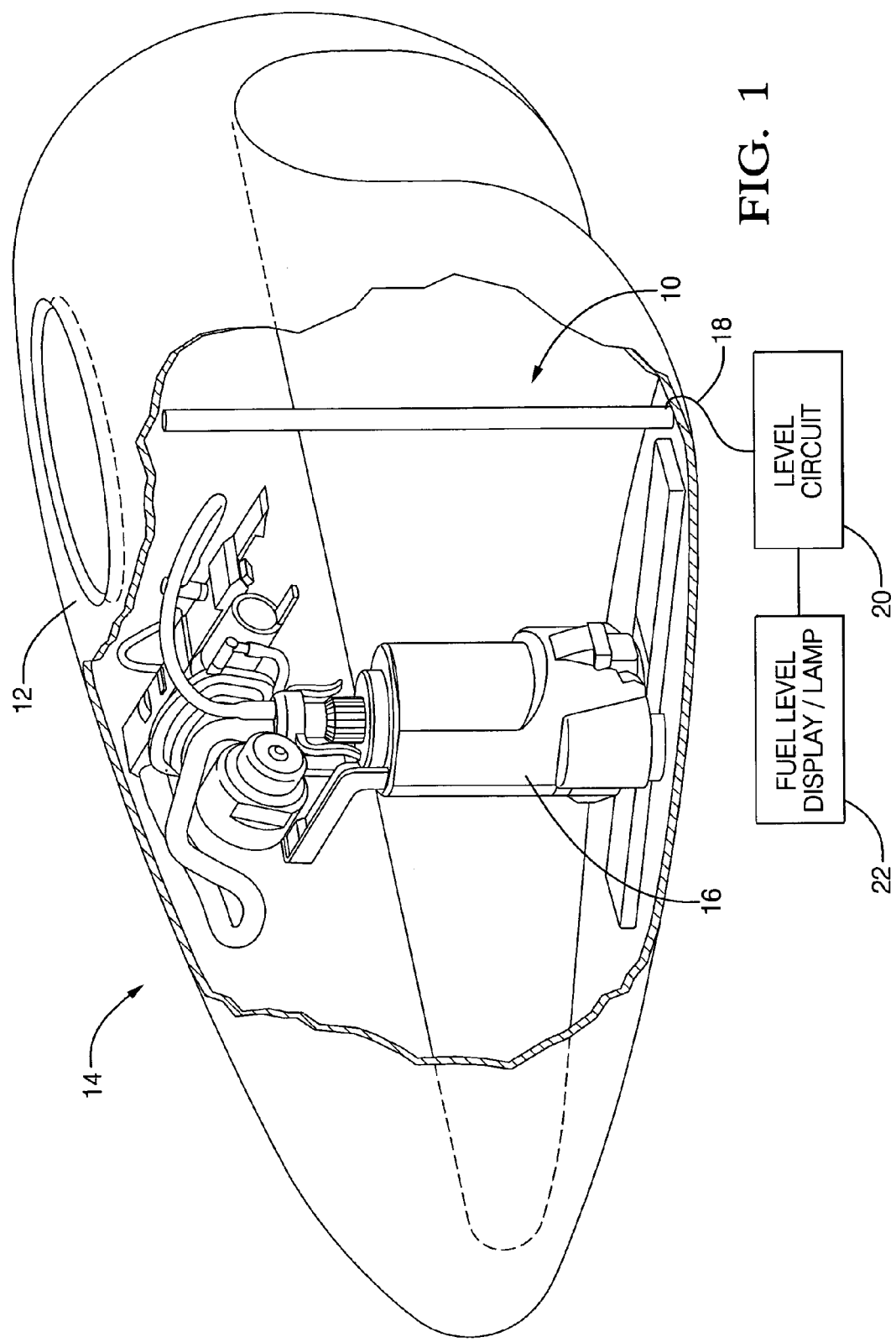
FIG. 1 is a cut-away perspective view of a fuel tank having the present fuel level sensor.

Referring initially to FIG. 1, a fluid level sensor is shown, generally designated 10, that can be disposed in a tank such as but not limited to a vehicle fuel tank 12 of a vehicle 14. In the non-limiting embodiment shown, the fuel tank 12 is a relatively small motorcycle fuel tank that may include interior fuel pumping and directing structure 16, the details of which are not central to the present invention.

As shown, the sensor 10 is oriented substantially vertically within the tank 12, and may be connected by one or more electrical leads 18 (only one lead 18 shown in FIG. 1 for clarity) to a level detection circuit 20. The level detection circuit 20 can send current to the sensor 10 and can process signals from the sensor 10 to drive one or more fuel level displays 22, including gages, warning lamps, and the like, in accordance with principles known in the art. The circuit 20 may be located inside or outside of the tank 12. Essentially, the signal output by the sensor 10 can be generally linear with fuel level in the tank 12, so that the circuit 20 can process the signal accordingly.

Figure 2:
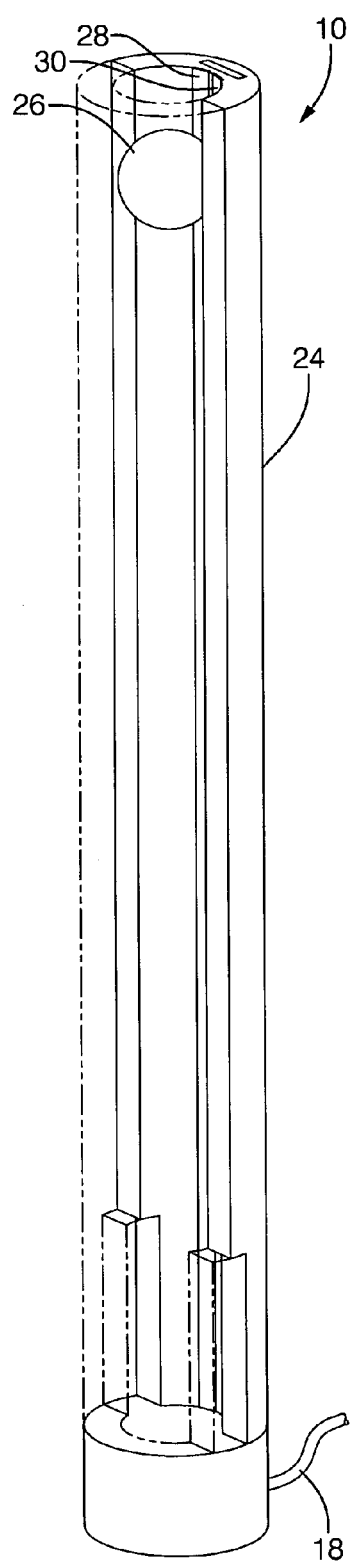
FIG. 2 is a perspective view of the present fuel level sensor, with portions of the housing not shown for clarity.
Figure 3:
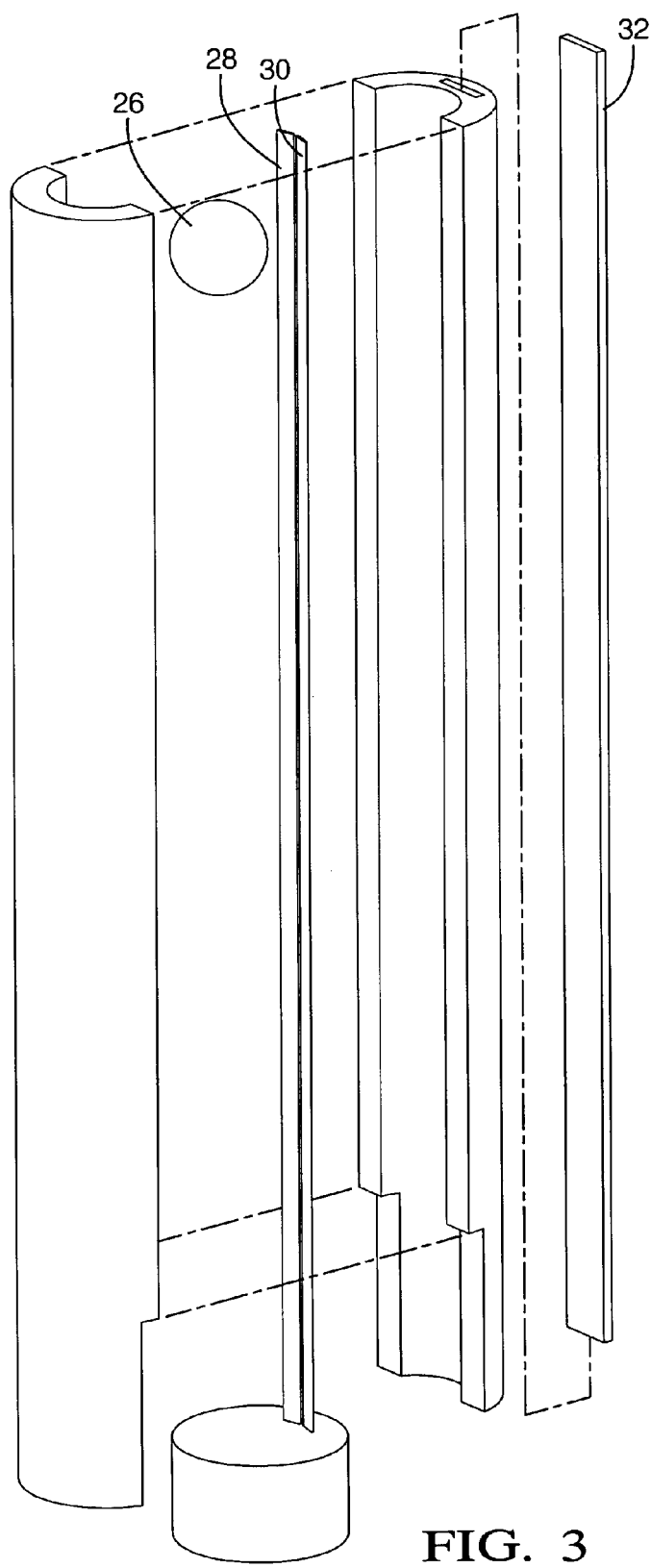
FIG. 3 is an exploded view of the present fuel level sensor.

FIGS. 2 and 3 show the details of the sensor 10. The sensor 10 includes an elongated, partially or completely cylindrical housing 24 that may be made of molded plastic if desired. A float 26 which can be spherical is disposed in the housing 24 for reciprocal vertical movement therein. That is, the housing 24 and/or structure therein may act as a guide that constrains the float 26 to substantially only vertical motion, relative to the orientation of the sensor 10 when it is installed as intended in the fuel tank 12. The float 26 can be hollow and in any case is buoyant, and can be plated with a magnetic or more preferably a ferromagnetic metal, or less preferably can be made entirely of such metal.

As shown in FIGS. 1 and 2, first and second resistive metal elongated strips 28, 30 which can be formed generally as parallelepiped-shaped strips are disposed in the housing 24 next to the float 26. The resistive strips 28, 30 extend substantially the length of the housing 24, and can be disposed substantially side-by-side each other in the housing 24 as shown. Each strip 28, 30 may be connected to a respective electrical lead 18 and hence to the circuit 20 shown in FIG. 1 for purposes to be shortly disclosed.

In the illustrative embodiment shown in FIGS. 1 and 2, a magnetically attractive strip 32 is also disposed in the housing 24 opposite the resistive strips 28, 30 from the float 26. The magnetically attractive strip 32 may be embedded in the body of the housing 24 if desired, and may extend substantially the length of the housing 24.

In one embodiment, the metal plating on the float 26 (or the float 26 itself) is ferromagnetic and the magnetically attractive strip 32 is magnetic. In another embodiment, the plating on the float 26 (or the float 26 itself) is magnetic and the magnetically attractive strip is ferromagnetic. In yet another embodiment, one or both of the resistive strips 28, 30 are magnetic, and no magnetic strip is separately provided. In each case, the result is to magnetically attract the float 26 against both resistive strips 28, 30 simultaneously, with the strength of the magnetic attraction being established such that as fluid level changes, the float 26 moves up or down in the housing 24 in rollable engagement with the resistive strips 28, 30 substantially without sliding against them. As the float moves, the resistance of the circuit that is defined by the first strip 28, through the float 26, and to and through the second strip 30 changes, thereby changing the output signal of the sensor 10.

In another, less preferred, embodiment, the float of the present invention may be disposed between a magnetic strip, on the one hand, and resistive strips on the other, with the exterior surface of the float defining one magnetic pole and the surface of the magnetic strip that faces the float defining the opposite magnetic pole to push the float away from the magnetic strip, against the resistive strips.

In any case, it may now be appreciated that if an input current is imposed on the first resistive strip 28 and fluid level changes in the tank 12, the float 26 rolls, but does not slide, against the strips 28, 30, causing a change in the resistance of the circuit and, hence, a change in the signal that is output from the sensor 10 (e.g., by tapping the second resistive strip 30). Owing to the rollable motion of the ball caused by the magnetic attraction, relatively little frictional force must be overcome compared to a sensor in which the float might slide against the resistive strips, thereby enabling the use of a smaller float 26 and, hence, facilitating a relatively smaller sensor 10 than has heretofore been provided.

While the particular FUEL LEVEL SENSOR as herein shown and described in detail is fully capable of attaining the above-described objects of the invention, it is to be understood that it is the presently preferred embodiment of the present invention.

What is claimed is:

1. A fuel level sensor disposable in fuel tank of a vehicle and comprising:
    a float;
    at least one guide constraining the float to substantially only vertical movement;
    two resistive strips juxtaposed with each other, each resistive strip being in rollable contact with the float against which the float can roll in the vertical dimension, a signal being obtainable from the resistive strips representative of the position of the float relative to the resistive strips; and
    at least one attraction strip opposite the resistive strips from the float and extending substantially the length of the resistive strips to attract the float, at least one of the float, and the attraction strip, being magnetic.

2. The sensor of claim 1, wherein the attraction strip is magnetic.

3. The sensor of claim 1, wherein the float rolls against the resistive strip and substantially does not slide against the resistive strip, owing to the influence of the attraction strip.

4. The sensor of claim 1, comprising first and second electrical leads connecting respective resistive strips to a level determination circuit.

5. The sensor of claim 4, further comprising a fuel tank holding the sensor.

6. A level sensor for a tank, comprising:
    a housing holding a float, motion of the float in the housing being constrained substantially to the vertical dimension when the sensor is disposed in the tank;
    two signal strips juxtaposed with each other, each signal strip being in rollable contact with the float and disposed in the housing; and
    means for magnetically forcing the float toward the signal strips such that when fluid level in the tank changes, the float rolls against the signal strips to alter a signal output therefrom, whereby the float substantially does not slide against the signal strips.

7. The sensor of claim 6, wherein the means for magnetically forcing includes at least one attraction strip opposite the signal strip from the float and extending substantially the length of the signal strip to attract the float, at least one of the float, and the attraction strip, being magnetic.

8. The sensor of claim 7, wherein the attraction strip is magnetic.

9. The sensor of claim 6, wherein the means for magnetically forcing is the signal strip, at least one of: the signal strip, and float, being magnetic.

10. The sensor of claim 6, comprising first and second electrical leads connecting respective signal strips to a level determination circuit.

11. The sensor of claim 6, further comprising a fuel tank holding the sensor.

12. A method for generating a signal representative of fluid level in a tank, comprising:
    orienting a housing generally vertically in the tank;
    disposing at least one float in the housing, the float being constrained for substantially only vertical motion in the housing;
    juxtaposing two resistive strips disposed in the housing, each of the resistive strips being in rollable contact with the float; and
    magnetically forcing the float against the resistive strip so that the float can roll against but substantially cannot slide against the resistive strip.

13. The method of claim 12, wherein the step of magnetically forcing includes disposing an attraction strip opposite the resistive strip from the float and extending substantially the length of the resistive strip to attract the float, at least one of the float, and the attraction strip, being magnetic.

14. The method of claim 13, wherein the attraction strip is magnetic.

15. The method of claim 12, wherein the act of magnetically attracting includes rendering at least one of: the float, and the resistive strip, magnetic.

16. The method of claim 12, comprising connecting first and second electrical leads to respective resistive strips and to a level determination circuit.

* * * * *